United States Patent
Simuttis

[11] Patent Number: 5,104,100
[45] Date of Patent: Apr. 14, 1992

[54] RUBBER MOUNT WITH HYDRAULIC DAMPING

[75] Inventor: Arnold Simuttis, Kreuznach, Fed. Rep. of Germany

[73] Assignee: Firma Carl Freudenberg, Weinheim/Bergstrasse, Fed. Rep. of Germany

[21] Appl. No.: 561,727

[22] Filed: Aug. 1, 1990

[30] Foreign Application Priority Data

Nov. 9, 1989 [DE] Fed. Rep. of Germany ....... 3937232

[51] Int. Cl.⁵ .................................................. F16F 5/00
[52] U.S. Cl. ................................ 267/240.1; 267/219; 218/562
[58] Field of Search ................ 267/140.1 A, 219; 180/300, 312; 248/562, 636, 638

[56] References Cited

U.S. PATENT DOCUMENTS

| | | | |
|---|---|---|---|
| 4,697,793 | 10/1987 | Reuter et al. | 267/140.1 A X |
| 4,852,864 | 8/1989 | Bitschkus et al. | 180/312 X |
| 4,886,251 | 12/1989 | Häussermann | 267/140.1 A |
| 4,905,955 | 3/1990 | Brizzolesi et al. | 267/140.1 A |
| 4,938,463 | 7/1990 | Miyamoto | 267/140.1 A |
| 5,009,403 | 4/1991 | Kato et al. | 267/219 X |

FOREIGN PATENT DOCUMENTS

| | | |
|---|---|---|
| 0332902 | 2/1989 | European Pat. Off. ......... 267/140.1 |
| 2727244 | 1/1978 | Fed. Rep. of Germany . |
| 3522482 | 1/1987 | Fed. Rep. of Germany . |

Primary Examiner—Robert J. Oberleitner
Assistant Examiner—Lee W. Young
Attorney, Agent, or Firm—Sprung Horn Kramer & Woods

[57] ABSTRACT

A rubber engine mount with hydraulic damping wherein, between the working chamber and the equalizing chamber (5, 6), a resiliently deformable partition (3) is disposed for displacement between supporting bodies (9). The partition (3) is provided at the margin with a rim (4) and has, at a radial distance from the rim, an annular thickened region (8) extending parallel to the rim. The thickness of the diaphragm increases from the rim (4) toward the thickened region (8).

8 Claims, 3 Drawing Sheets

RUBBER MOUNT WITH HYDRAULIC DAMPING

BACKGROUND OF THE INVENTION

The invention relates to an elastomeric (e.g., rubber) mount with hydraulic damping. The mount comprises a support member with a circumferential groove and a resiliently deformable one piece partition having a circumferential rim arranged in the groove. The partition provides a separation between a working chamber and an equalizing chamber and incorporates at least one thickened region radially inside of the rim in a first portion and has at least one slit in a second portion.

A rubber engine mount of this type is disclosed in the German Patent No. 35 22 482. It finds application preferably in the mounting of piston engines in a motor vehicle, and in the like-new state it distinguishes itself by excellent working characteristics. These working characteristics, however, can suffer a certain degradation over long-term use.

A similar engine mount is disclosed in the German Published Patent Application No. 27 27 244. For the isolation of high-frequency vibrations caused by engines, a partition is provided between the working chamber and the equalizing chamber which can move back and forth between grids. This partition comes into alternating contact with the grids when low-frequency vibrations of great amplitude are introduced—for example, when the vehicle travels over an irregular road surface—and this contact becomes plainly audible. In this type of construction, too, degradation of the working characteristics can be encountered after a long period of use.

SUMMARY OF THE INVENTION

It is a principal object of the present invention to develop a rubber engine mount which will be noise-free and which will have virtually unaltered working properties over long periods of use and will afford good isolation of engine-caused high-frequency vibrations as well as good damping of simultaneously introduced, road-caused vibrations.

This object, as well as other objects which will become apparent in the discussion that follows, are achieved, in accordance with the present invention, in a rubber engine mount of the type described above, wherein the thickened region on the partition is of an annular configuration and extends parallel to the rim at a radial distance therefrom; wherein the partition has a thickness increasing from the rim toward the thickened region; and wherein the partition with the thickened region ca make contact at least unilaterally with a supporting body in the engine mount.

By the annular configuration of the thickened region, the partition, which consists of rubber, is given a substantial improvement of its mechanical strength, while the partition, increasing in thickness over its entire circumference from the rim toward the thickened region, achieves a balanced deformation behavior. Overstressing of the partition caused by deformation is prevented in this manner, thereby favoring the attainment of a long useful life.

Since the thickness of the partition increases toward the thickened region, it offers an increasing resistance to flexure toward the working chamber and equalization chamber, resulting in an increasing retardation of the velocity of movement with the increasing magnitude of its excursions. The collision with the supporting body that occurs in the case of an excursion of extreme magnitude can thus be substantially noiseless. The supporting body is fixed in relation to the engine mount; consequently, it can block excessive flexure of the partition, protecting it against overstretching.

The supporting body is configured so as to avoid any appreciable blocking of the partition, so that pressures prevailing in the working chamber and in the equalization chamber can thus act with virtually their full force on the partition. Pressure changes caused by the introduction of audible high-frequency vibrations are accordingly compensated in an excellent manner by a relative displacement of the partition, while the partition offers to the low-frequency vibrations caused by traveling over uneven road surfaces as much resistance as is necessary for the achievement of a good damping action in a damping passage connecting the working chamber and the equalizing chamber.

Extreme pressures which can occur in the working chamber or in the equalizing chamber as a result of starting the engine of the motor vehicle in which the engine mount is used, or of overrunning a curb on the side of the road, are absorbed by the valve function of the slits. These slits are produced without removing any material and can consist of rectilinear cuts. Such overpressures result in a transient uplifting of the portions of the partition adjacent the slits; This causes a rapid pressure drop and prevents the relative movements of the internal combustion engine from being transmitted to the vehicle body. The slits begin and terminate in the area of the thickened region, thereby largely preventing them from propagating and lengthening toward the rim. The working properties accordingly remain almost entirely unaltered over long periods of time. In the area of the rim and/or of the thickened region an axial clearance can be provided, which if desired can be different in each case. The axial relative flexibility of the partition in the areas adjoining the thickened region inside and outside of the latter can thus be made different from one another. This is a great advantage for the isolation of high-frequency vibrations.

At least one deformation body of small cross section can be provided in the area of the thickened region, projecting toward the supporting body and integral with the partition. The projecting end of this deformation body can touch the supporting body when the partition is in the un-flexed state, which results in a still greater suppression of contact noise.

A deformation body of this kind can be of an annular configuration, in which case it has proven advantageous, for the purpose of assuring the ease of relative movement of the partition, if the deformation body is interrupted by gaps at uniformly distributed circumferential intervals. In the areas between the gaps the deformation body can be nubby and, for example, can be cup-shaped or conical.

A still greater flexibility of the deformation body can be achieved if it is inclined at an acute angle to the plane of the partition. The progressive resistance which the partition offers to an axial excursion can thus be very significantly increased while providing easy relative movement in the initial phase.

The partition can be disposed in the area between supporting bodies facing it on both sides, with which it can come in contact alternately. It is thus protected against excessive excursions in either direction.

In general it has proven to be advantageous for the partition to have a substantially uniformly increasing thickness toward the thickened region. The achievement of uniform flexure in the stated range is thereby enhanced. It has also proven advantageous for the partition to have a thickness that is as small as possible in the area of the rim, and that is substantially the same thickness as the thickened region in the area of the thickened region. Under normal running conditions, no resilient flexure of the partition occurs radially within the rim. The slits are disposed in this area and serve to relieve over-pressures as stated above.

The supporting body is best made circular in the area of the thickened region, to provide uniform support to the thickened region and hence to the partition whenever extreme pressures occur in the working chamber or in the equalizing chamber. It is desirable for the thickened region and the circular part of the supporting body to be disposed approximately in the center between the rim and the center of the partition. Especially in such an embodiment, optimum properties will be achieved, both in regard to the hydrodynamic processes which occur in the working chamber and equalizing chamber during proper use, and in regard to the long useful life of the partition.

The preferred embodiments of the present invention will now be described with reference to the accompanying drawings.

DESCRIPTION OF THE PREFERRED EMBODIMENTS

Figure 1:
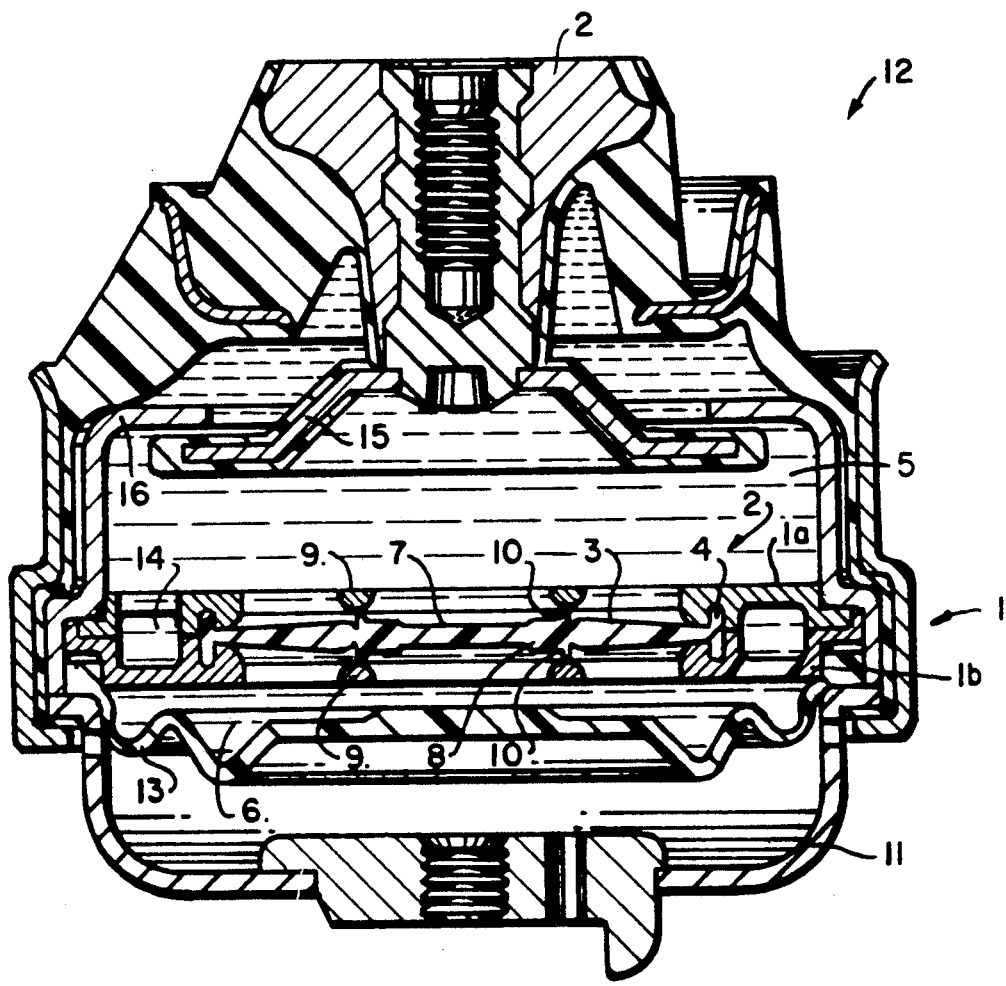
FIG. 1 is a longitudinal cross-sectional view of a rubber engine mount according to the invention.

As shown in FIG. 1, an engine mount 1 according to the present invention has an inwardly open circumferential groove in which a bellows 13 as well as a supporting body 9, constituted by two superimposed plates 1a, 1b, are held in a liquid-tight manner. The plates 1a and 1b are both pierced by a spiral damping passage 14 connecting a working chamber 5 to an equalizing chamber 6. Furthermore, together they surround a groove 2 which holds the rim 4 of a partition 3. At a radially inward distance from the rim 4, the partition 3 has a thickened region 8 of circular shape. Between the rim 4 and the thickened region 8, in the area of the rim 4, the thickness of the partition 3 is kept as small as possible; and in the area of the thickened region 8 the partition has the same thickness as the latter. Radially inside of the circular thickened region 8, the partition 3 again has substantially the same thickness which it has in the area of the rim 4. Its surfaces facing the working chamber 5 and the equalizing chamber 6, respectively, extend substantially in parallel and the partition 3 is pierced in this area by a slit 7 cut perpendicular to its plane.

The partition 3 is made of a single piece of rubber and is provided in the area of the thickened region 8 with small studs 10. When the partition 3 is in the undeformed state, the studs 10 are in loose contact with the supporting bodies 9, which in this area are arranged in a circle. The studs 10 have an especially small cross section and a triangular profile forming an acute angle with the plane of the partition. They are of a stubby shape and are uniformly distributed circumferentially. These deformation bodies (studs) offer only a slight resistance to an initial flexural movement of the partition 3 upon the occurrence of a pressure change in the working chamber 5 or in the equalization chamber 6, but as the magnitude of the deformation increases they offer a progressively greater resistance. In this manner the necessary pressure rise in the working chamber 5 or equalization chamber 6 is assured, which is necessary in order to permit portions of the fluid to be forced through the damping passage 14 and achieve a damping effect. The working chamber 5, the equalizing chamber 6 and the damping passage 14 are completely filled with a hydraulic fluid while they are properly employed.

Figure 2:
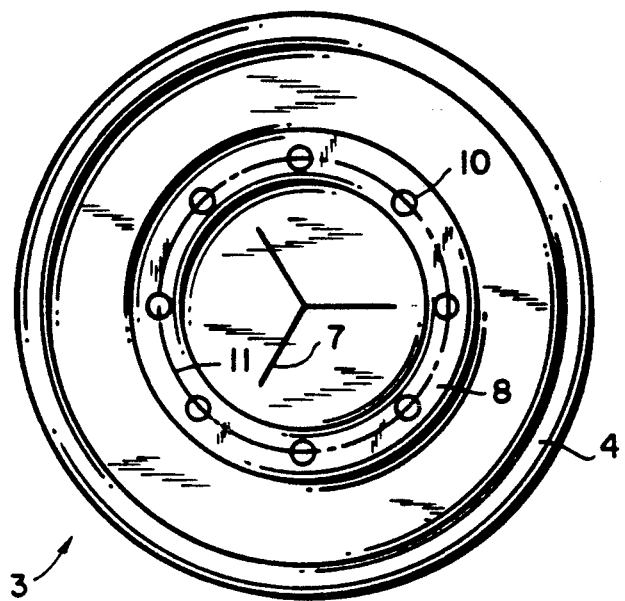
FIG. 2 to 4 show partitions similar to the type shown in FIG. 1 in plan view (FIG. 2) and in cross section (FIGS. 3 and 4).

The rubber engine mount shown in FIG. 1 is shown in the unloaded state, i.e., before the application of the static load which it is designed to bear. The result is a mutual contact between the stop plate 15 and the abutment 16. After the static load has been applied they will be at an axial distance apart, which will be equal to the distance between the stop plate 15 and the upper side of the supporting body 9. The clearance which the block 2 has for movement with respect to the engine mount 1 is thus substantially equal in both directions. FIG. 2 illustrates in plan view the partition 3 which is used in the engine mount of FIG. 1. The studded configuration of the deformation bodies 10 is thus made visible, as well as their arrangement at equal circumferential intervals. The slit 7 is comprised of three cuts made at angles of 120° apart and meeting at the center.

Figure 3:
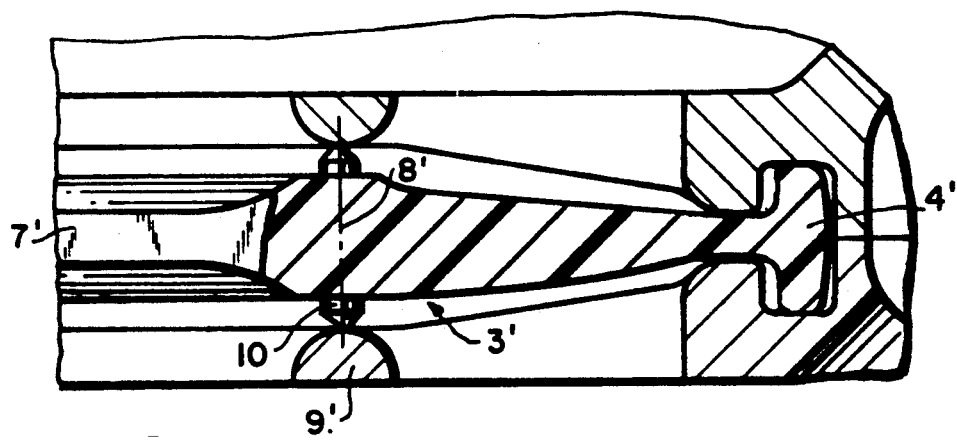

FIG. 3 shows the clamping area of another embodiment of a partition. It can be seen that the deformation bodies in the relaxed state of the partition touch the supporting body 9' with conically projecting points. Furthermore, in the area between the rim 4' and the thickened region 8', the partition 3' has a thickness which increases continuously toward the thickened region 8'. The slit is indicated at 7'.

Figure 4:
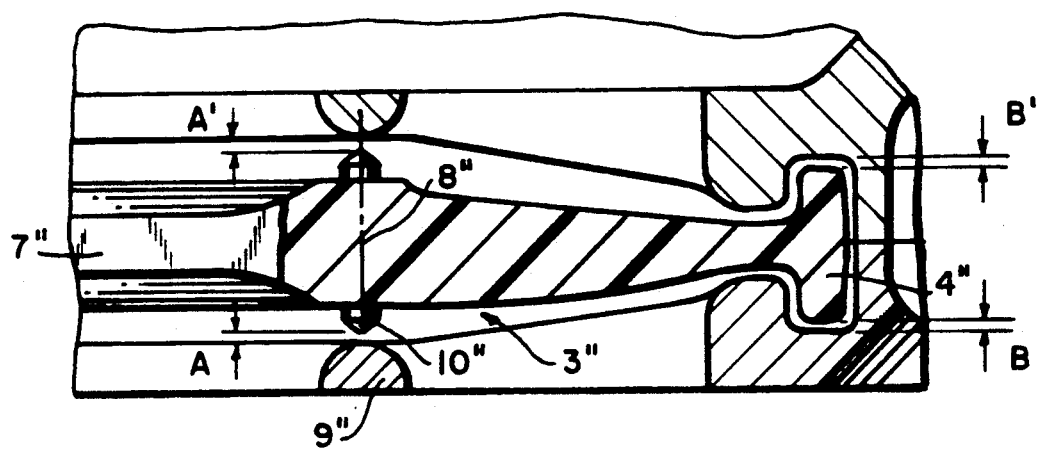

FIG. 4 illustrates still another arrangement similar to that described above. The partition 3" in this embodiment, however, is configured such that, during proper use, a clearance A, A', is created in the area of the deformation bodies 10", and a clearance B, B', in the area of the rim 4". The clearances can be of different magnitudes in the two areas.

Figure 5:
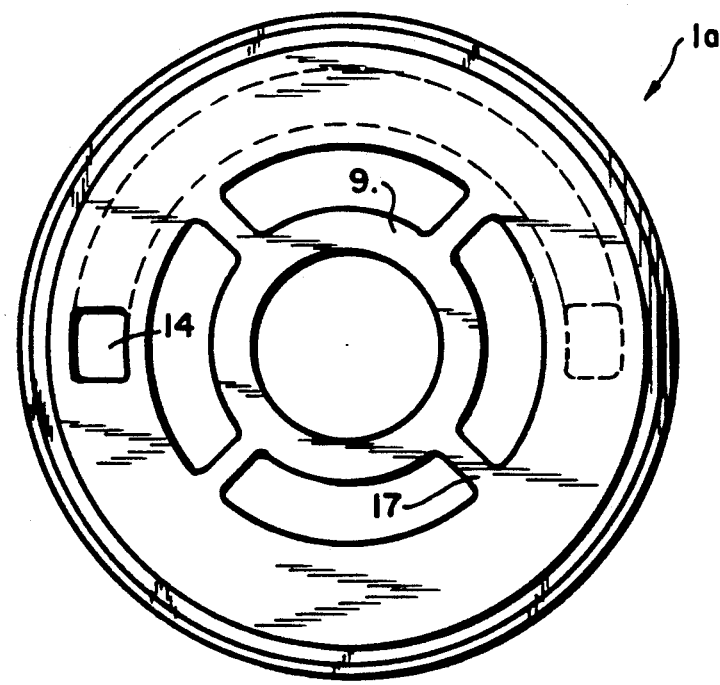
FIG. 5 shows a plan view of a supporting body similar to the type shown in FIG. 1.

FIG. 5 shows a top view of the plate 1a of the rubber engine mount of FIG. 1. This figure indicates the circular configuration of the supporting body 9, as well as how the supporting body 9 is affixed to the outer part of the plate 1a by relatively short radial spokes 17. The interstices between the spokes are correspondingly large, which results in making the partition (not shown) accessible to the pressure changes appearing in the working chamber during use. The spiral damping passage has a opening 14 at one end and is configured in the manner indicated by the broken lines.

There has thus been shown and described a novel hydraulically damped rubber cartridge spring which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An elastomeric mount with hydraulic damping, comprising (1) a support member with a circumferential groove and (2) a resiliently deformable, one piece partition having a circumferential rim arranged in said groove, said partition providing a separation between a working chamber and an equalizing chamber and incorporating at least one thickened region radially inside of the rim, the improvement wherein the thickened region is annular in shape and extends parallel to the rim at a radial distance therefrom, wherein the partition has an increasing thickness from the rim toward the thickened region, wherein the mount further comprises a supporting body disposed on each side of the thickened region of the partition, wherein the partition includes a plurality of studs of small lateral cross section disposed on each side of the thickened region and projecting toward the supporting body on the respective side of the thickened region, and wherein the plurality of studs are continuously in contact with their respective supporting bodies when the partition is in a central, rest position.

2. The mount defined in claim 1, wherein the rim is held in the groove with axial free play.

3. The mount defined in claim 2, wherein an axial free play is provided between the thickened region and the supporting body.

4. The mount defined in claim 3, wherein the free play is different in the area of the rim from the free play in the area of the thickened region.

5. The mount defined in claim 1, wherein the partition has a thickness increasing substantially uniformly from the rim toward the thickened region.

6. The mount defined in claim 5, wherein the thickness of the partition is substantially smaller in the area of the rim than in the area of the thickened region.

7. The mount defined in claim 1, wherein the supporting body is of an annular configuration in the area of the thickened region and is positioned to avoid of any appreciable over stressing of the partition.

8. The mount defined in claim 7, wherein the thickened region and the annular portion of the supporting body are disposed approximately halfway between the rim and the center of the partition.

* * * * *